United States Patent [19]

Takeda

[11] Patent Number: 5,587,415
[45] Date of Patent: Dec. 24, 1996

[54] PROCESS FOR PREPARATION OF DISPERSION OF WATER-SOLUBLE CATIONIC POLYMER THE DISPERSION PRODUCED THEREBY AND ITS USE

[75] Inventor: Hisao Takeda, Zama, Japan

[73] Assignee: HYMO Corporation, Japan

[21] Appl. No.: 502,613

[22] Filed: Jul. 14, 1995

Related U.S. Application Data

[63] Continuation-in-part of Ser. No. 263,536, Jun. 22, 1994, abandoned, which is a continuation of Ser. No. 153,750, Nov. 17, 1993, abandoned, which is a continuation-in-part of Ser. No. 921,566, Jul. 29, 1992, abandoned.

[30] Foreign Application Priority Data

Jul. 30, 1991 [JP] Japan .................................. 3-211309

[51] Int. Cl.$^6$ ........................................................ C08F 2/16
[52] U.S. Cl. ........................ 524/458; 524/460; 210/734; 210/735
[58] Field of Search ................................. 524/815, 825, 524/458, 460; 210/705, 734, 735

[56] References Cited

U.S. PATENT DOCUMENTS 4,929,655  5/1990  Takeda et al. ........................ 524/548

*Primary Examiner*—Jeffrey T. Smith
*Attorney, Agent, or Firm*—Ostrolenk, Faber, Gerb & Soffen, LLP

[57] ABSTRACT

A water-soluble cationic (co)polymer dispersion prepared by the polymerization of a specified cationic quaternary monomer, which is obtained by quaternization by use of an alkyl halide, optionally with another cationic monomer and/or (meth)acrylamide, the polymerization being carried out in a salt solution which does not dissolve the resulting (co)polymer, and in the presence of a specific cationic polymer dispersant which is soluble in the salt solution, and its use as a flocculant or a paper chemical are provided.

26 Claims, No Drawings

PROCESS FOR PREPARATION OF DISPERSION OF WATER-SOLUBLE CATIONIC POLYMER THE DISPERSION PRODUCED THEREBY AND ITS USE

This is a Continuation-in-part of application Ser. No. 08/263,536, filed on Jun. 22, 1994 now abandoned, which is a Continuation of application Ser. No. 08/153,750, filed Nov. 17, 1993 now abandoned which is a Continuation-in-part of application Ser. No. 07/921,566, filed Jul. 29, 1992 now abandoned.

BACKGROUND OF THE INVENTION

1. Field of the Invention

The present invention relates to a water-soluble cationic polymer dispersion produced by a specific process, and its use, especially in the waste water treatment as a flocculant, and in paper manufacturing as a paper chemical.

2. Background Art

Various types of processes have been utilized for the preparation of the aforesaid water-soluble cationic polymer. A stationary aqueous phase polymerization is a well-known process. Japanese Patent Laid-Open Application No.54-102388 discloses a water-in-oil type emulsion polymerization process. Japanese Patent Laid-Open Application No.54-69169 teaches a suspension polymerization process in a hydrophobic solvent.

There are a number of disadvantages associated with the known prior art processes such as those as set forth above.

In the stationary aqueous phase polymerization, it is necessary to employ a monomer concentration of more than 10% by weight in order to obtain a polymer having a suitable high-molecular weight.

The polymerization in such a higher monomer concentration gives a gelatinous hydrated polymer which is difficult to dissolve in the aqueous medium employed; therefore, it is necessary to ship the polymer product in a fluid form as a diluted solution after further dilution or in a powdered product after drying.

Shipment of the polymer in a diluted solution increases the costs of transportation, whereas shipment in a powdered form increases the cost of fuel for drying. Further, when heated in the drying process, three-dimensional crosslinking of the polymer may occur, yielding a partially water insoluble polymer.

The inflammability of the product as well as a wasteful use of expensive organic solvent are the drawbacks of the water-in-oil type emulsion polymerization process.

On the other hand, suspension polymerization in a hydrophobic solvent employs an inflammable solvent such as cyclohexane and toluene; therefore, plant investment costs are very high.

Japanese Patent Laid-Open Application No.50-70489 teaches a precipitation polymerization in an ammonium sulfate solution for the preparation of a nonionic or an anionic water-soluble polymer. The plant investment costs for the precipitation polymerization process are not expensive; however, the resulting polymer particles are sticky and have a tendency to agglomerate with each other to thereby give a large polymer mass which is not easy to handle.

Further, Japanese Patent Laid-Open Publication No.61-123610 (which partially corresponds to EP-A-0183466) proposes a process for the polymerization or copolymerization of a quaternary benzyl chloride salt of dimethylaminoethyl(meth)acrylate as a cationic monomer in which the polymerization is carried out in an aqueous salt solution which does not dissolve the resulting polymer or copolymer, and in the presence of a polymer which is soluble in the salt solution to thereby provide a cationic water-soluble polymer in a dispersed state. This proposal may be effective in solving problems associated with the known prior art processes as set forth above; however, the process has the disadvantage that the cationic monomer which can be used is limited only to the quaternary benzyl chloride salts of dimethylaminoethyl (meth)acrylate, and the like.

Accordingly, it is the principal object of the present invention to provide a novel cationic water-soluble polymer dispersion having the following features:

A. As the cationic monomer, the quaternary aliphatic halide salts of dimethylaminoethyl(meth)acrylate and the like is employed instead of the quaternary benzyl chloride salts.

B. The dispersion polymer products having different hydrophobicity are easily prepared by changing the length of aliphatic chain.

C. Several new characteristics could be obtained through this invention, which are valuable in the field application, such as higher floatation speed of the suspended particles (Example 4), improved sizing effect of rosin sizing agent with less addition of aluminum sulfate (Example 6), the enhanced sludge dehydrating and drainage property (Examples 5 and 7). (The details of such effects are explained in the referred examples.)

D. The production is carried out in an aqueous solution in the absence of an inflammable solvent.

E. The investment costs for the polymer dispersion is not expensive.

F. The resulting polymer particles are not sticky, and have not a tendency of forming gel, therefore, the resultant dispersion may easily be handled.

G. The resulting polymer dispersion has a good fluidity in high concentration level, thus decreasing the costs of transportation.

As a result, it is possible to provide a highly fluid dispersion of cationic water-soluble polymer having a greater hydrophobic property than that according to the technique disclosed in Japanese Patent Laid-Open Publication No.61-123610 (which partially corresponds to EP-A-0183466) by adopting the component of the present invention, thus improves substantially the operational performances in such application areas as waste water treatment and paper manufacturing.

SUMMARY OF THE INVENTION

In accordance with the present invention the foregoing objects and advantages are readily obtained.

One aspect of the present invention provides a dispersion of a water-soluble cationic polymer prepared by use of a cationic quaternary monomer obtained by the quaternization of dimethylaminoethyl (meth)acrylate, and the like, with a specific aliphatic halide, and its use. The polymerization is carried out in an aqueous salt solution which dissolves the used monomers, but does not dissolve the resulting polymer or copolymer, and in the presence of a dispersant which is a specific cationic polymer soluble in the salt solution.

Other objects, features and advantages of the present invention will become apparent from the following description.

DETAILED DESCRIPTION OF THE PREFERRED EMBODIMENTS

The object of the present invention is to provide a dispersion of a water-soluble cationic polymer prepared by use of a cationic monomer mixture consisting essentially of one or more of cationic monomers in an amount of 5 to 100% by mole, represented by the following formula (1):

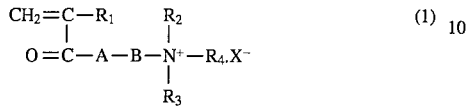

wherein A=O or NH; B=$CH_2CH_2$, $CH_2CH_2CH_2$ or $CH_2CHOHCH_2$; $R_1$=H or $CH_3$; $R_2$, $R_3$=$CH_3$ or $CH_2CH_3$; $R_4$=$(CH_2)_nCH_3$ (wherein n=3 to 9); $X^-$=anionic counterion;

one or more of cationic monomers in an amount of 0 to 50% by mole, represented by the following formula (2):

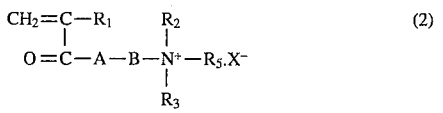

wherein A=O or NH; B=$CH_2CH_2$, $CH_2CH_2CH_2$ or $CH_2CHOHCH_2$; $R_1$=H or $CH_3$; $R_2$, $R_3$=$CH_3$ or $CH_2CH_3$; $R_5$=H, $CH_3$ or $CH_2CH_3$ (wherein the total carbon atoms of $R_2$, $R_3$ and $R_5$ do not exceed 5), $X^-$=anionic counterion; and (meth)acrylamide in an amount of 0 to 95% by mole.

In copolymerization, the preferred molar ratio of the monomer represented by the formula (1) to the monomer by (2) is always more than 1.

The polymerization or copolymerization is carried out in an aqueous salt solution which can dissolve the used monomers, but does not dissolve the resulting polymer or copolymer, with stirring and in the presence of a dispersant which is a specific cationic polymer soluble in the salt solution, said polymer dispersant comprising at least one monomer represented by the above formula (2) in an amount of more than 20% by mole.

Any monomers represented by the formula (1) may be employed; however, preferred examples include quaternary salts obtained by the reaction of an alkyl halide having $C_4$ to $C_{10}$ carbon atoms with dimethylaminoethyl(meth)acrylate; diethylaminoethyl(meth)acrylate; dimethylaminohydroxypropyl(meth)acrylate; or dimethylaminopropyl(meth)acrylamide.

Quaternary monomers obtained by the reaction of an alkyl halide having $C_3$ or lower carbon atoms are not suitable because the resulting polymer is partly soluble in the salt solution, whereas quaternary monomers obtained from an alkyl halide having $C_{11}$ or higher carbon atoms are also not suitable because they are insoluble in the salt solution.

Typical examples of the cationic monomers represented by the formula (2) include monomers obtained by neutralization with hydrochloric acid or sulfuric acid, or by quaternization with methyl chloride or dimethyl sulfate of a monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide. Other cationic monomers which satisfy the formula (2) may also be employed. Thus the cationic type monomers being employable according to the present invention should be represented by the formulas (1) and (2).

In addition to the monomers which are (meth)acrylamide or represented by the formula (1) or (2), other type monomers such as acrylonitrile, methyl acrylate, ethyl acrylate, and the like may be employed as a comonomer in an amount of up to the limit of solubility of the comonomer in the aqueous salt solution, so long as the resulting copolymer is water-soluble and is insoluble in the aqueous salt solution according to the present invention.

It is a prerequisite for the process for realizing the present invention that the resulting copolymer is insoluble in the aqueous salt solution as a polymerization medium; that is to say, the copolymer can be separated out of the salt solution by salting-out.

Polymers which are most readily separated out are homopolymers obtained from the monomers represented by the formula (1). Homopolymers obtained from the monomers represented by the formula (2) cannot be separated out. Therefore, when the copolymerization of the cationic monomers represented by the formulas (1) and (2) is carried out, it is preferable that the molar ratio of the monomer represented by the formula (1) to the monomer represented by the formula (2) is more than 1.

Contrary to the resulting copolymer, the dispersant employed in the polymerization should be readily soluble in the aqueous salt solution; therefore, the preferred dispersant comprises a cationic polymer comprising the monomers represented by the formula (2) in an amount of more than 20% by mole.

The most preferred dispersant is a homopolymer obtained from one of the monomers represented by the formula (2). Copolymers may be used provided that they are soluble in the salt solution. Acrylamide is a typical comonomer which may be copolymerized with the monomer represented by the formula (2).

In realizing the present invention, polymerization is carried out in the presence of the dispersant with stirring by use of the monomer or monomer mixture in an aqueous salt solution. The preferred monomer concentration is in a range from 5 to 30% by weight.

Further, insolubility of the resulting polymer or copolymer in the aqueous salt solution used as a dispersion medium is a prerequisite for the salt solution used.

Any salts may be employed for preparing the aqueous dispersion, so long as they do not dissolve the resulting polymer. Typical examples of the salts include polyvalent anion salts such as sodium sulfate, ammonium sulfate, magnesium sulfate, aluminum Sulfate, and sodium dihydrogenphosphate.

As for the salt concentration, it will depend on the molar ratio of cationic monomers represented by the formulas (1) and (2), and the kind of the salt employed. In general a range of from 15% by weight or beyond, up to the limit of solubility of the salt is preferred. It is also possible to add further amount of salt after polymerization into the resulting polymer dispersion in the range of solubility.

According to the present invention the kind and the amount of the used salt in the aqueous salt solution is such that the employed monomers and the employed dispersant are dissolved but the resulting polymer are not dissolved in the aqueous salt solution.

The preferred amount of dispersant is 1 to 10% by weight, based on the total weight of monomers. When the amount is less than 1% by weight, the polymerization gives sticky polymer particles which tend to result in separation of a bulky polymer mass. Inversely, when it is more than 10% by weight, additional merits cannot be obtained.

The polymerization temperature will depend on the kind of the initiator. Any temperature may be employed, with proviso that the particular initiator can function.

Further, any initiator may be employed such as redox or azo type initiators.

The process for realizing the dispersion of the present invention is characterized in that the polymerization of a cationic monomer of the formula (1) or mixture thereof, is carried out in an aqueous salt solution which is a dispersion medium, with stirring in the presence of a cationic polymer dispersant which is soluble in the aqueous salt solution. The role of the salt in the dispersion medium, in this case, is to prevent the resulting polymer from becoming dissolved in said dispersion medium.

Although the role of the dispersant of cationic polymer has not been fully elucidated, it is presumed to act as a protective colloid, keeping the polymer particles highly dispersed.

In spite of the water-soluble cationic polymer, the resulting polymer is difficult to dissolve in a salt solution because the amino group of the cationic monomer by the formula (1) has been combined with an alkyl group which is strongly hydrophobic.

According to the present invention, the dispersion contains water soluble polymer molecules at high concentration level, but because of the high concentration of salt existing in the medium these molecules cannot dissolve in the medium and are dispersed therein as independent fine particles. They do not interact each other and therefore the resultant viscosity of dispersion is very low. Dispersed polymer particles are small, have an average diameter of 0.1~300 μm, and quickly dissolve into water. As the polymer molecules used in this invention are of very hydrophobic nature, so it behaves differently from the conventional polymers in the market.

The dispersion of the present invention is preferably used in the waste water treatment field as a flocculant, and in the paper manufacturing field as a paper chemical. The flocculant is used as a floating agent or a dehydrating agent, and the paper chemical is used as a retention aid for a sizing agent and as a drainage aid.

In the waste water treatment, the dispersion according to the present invention may be diluted as an aqueous solution, and may be added into the waste water comprising sludge. Then, the comprised sludge is flocculated by the polymer, and the flocculated sludge is then filtrated and dehydrated, or is then floated and raked together. Accordingly, it is necessary for the polymer to have a property so as to highly dehydrate the flocculated sludge and/or a property so as to speedy float the flocculated sludge.

When the dispersion of the present invention is used in the waste water treatment process as a flocculant, it shows higher floatation speed and improved dehydrating capacity as shown respectively in Example 4 and Example 5.

In the paper manufacturing process, the dispersion according to the present invention may be fed into the process as a dilute aqueous solution. When making paper, the contained water must be smoothly drained. On the contrary, the contained paper chemicals, e.g a sizing agent, must be certainly retained therein. Accordingly, it is necessary for the polymer to have a property so as to highly drain the contained water and/or a property so as to certainly retain the contained paper chemical agents.

When the dispersion of the present invention is used in the paper manufacturing process as a paper chemical, the polymer having higher hydrophobicity is favorable as the retention aid for the sizing agent and as the drainage aid as well. Examples 6 and 7 show respectively these effects.

It is remarkable achievement of the present invention that such high performance dispersion polymer products have become possible to be offered in the market. Usually these products are fed into the process as a dilute aqueous solution, e.g. 0.2% as polymer, and the fact that the products of the present invention are supplied as an easy flowable dispersion will contribute substantially to simplify and/or automatize the dissolution system. And when the situation allows one may consider to supply the products into the sludge and paper process directly.

In case the product is used for the waste water treatment preferable polymer amount is 0.1~2% of solid content, and in paper process 0.001~0.1% of polymer is used against pulp weight.

The following examples will further illustrate the present invention, which by no means limit the invention.

EXAMPLE 1

In a 1-liter, 5-necked separation flask was placed 2.7 g of a homopolymer of acryloyloxyethyltrimethylammonium chloride as a dispersant, 112.3 g of ammonium sulfate and 392.3 g of deionized water to prepare a solution. To the solution were added 65.8 g (90% by mole) of acrylamide and 26.9 g (10% by mole) of 90% aqueous solution of acryloyloxyethyldimethylbutylammonium chloride, followed by heating to 50° C. and the air inside was displaced by nitrogen.

To the mixture was added 1.8 g of 1% aqueous solution of 2,2'-azobis (2-amidinopropane) hydrochloride, followed by polymerization at 50° C. for 10 hours with stirring to thereby provide polymer particles finely dispersed in a salt solution.

The polymer dispersion had a viscosity of 2500 cp (at 25° C.), and the viscosity of the 0.5% polymer in 4% aqueous NaCl solution was 28 cp. The average diameter of the particles of the polymer dispersion was 25 μm by microscopic observation.

After stationary keeping for one month at a room temperature, the polymer dispersion was still in a dispersed state and could be analyzed to have the same fine particles as that just prepared.

EXAMPLE 2

In the separation flask employed in Example 1 were placed 2.7 g of a copolymer (molar ratio=50:50) of acrylamide with acryloyloxyethyltrimethylammonium chloride as a dispersant, 102.3 g of sodium sulfate, followed by dissolving in 398.2 g of deionized water.

To the solution were added 37.4 g (75% by mole) of acrylamide, 50.3 g (20% by mole) of 90% aqueous solution of methacryloyloxyethyldimethylhexylammonium bromide, 9.1 g (5% by mole) of 80% aqueous solution of acrylamidepropyltrimethylammonium chloride, followed by heating to 50° C. and the air inside was displaced by a nitrogen.

To the mixture was further added 1.8 g of 1% aqueous solution of 2,2'-azobis(2-amidinopropane) hydrochloride as an initiator, followed by polymerization at 50° C. for 10 hours to thereby provide polymer particles finely dispersed in an aqueous salt solution.

The polymer solution had a viscosity (at 25° C.) of 3200 cp. The viscosity of the 0.5% polymer in 2% aqueous ammonium sulfate solution was 35 cp. The average diameter of the particles of the polymer dispersion was 30 μm by microscopic observation.

After stationary keeping for one month at a room temperature, the polymer dispersion was still in a dispersed state and did not coagulate.

EXAMPLE 3

In the separation flask employed in Example 1 were placed 2.7 g of a homopolymer of methacryloyloxyethyltrimethylammonium chloride as a dispersant, 112.3 g of sodium sulfate, followed by dissolving in 386.2 g of deionized water.

To the solution were added 25.0 g (65% by mole) of acrylamide, 59.7 g (25% by mole) of 90% aqueous solution of acrylamidopropyldimethyloctylammonium iodide, 14.1 g (10% by mole) of 80% aqueous solution of methacryloyloxyethyltrimethylethylammonium chloride, followed by heating to 50° C. and the air inside was displaced by nitrogen.

To the mixture was further added 1.8 g of 1% aqueous solution of 2,2'-azobis (2-amidinopropane) hydrochloride as an initiator, followed by polymerization at 50° C. for 10 hours to thereby providing polymer particles finely dispersed in an aqueous salt solution.

The polymer dispersion has a viscosity (at 25° C.) of 4500 cp which is lowered to 500 cp after addition of 20 g of ammonium sulfate to the dispersion.

The viscosity of the 0.5% polymer in 2% aqueous ammonium sulfate solution was 40 cp. The average diameter of the particles of the polymer dispersion was 50 μm by microscopic observation.

After stationary keeping for one month at a room temperature, the polymer dispersion was still in a dispersed state and could be analyzed to have the same fine particles as that just prepared.

COMPARATIVE EXAMPLE 1

In the separation flask employed in Example 1 were placed 2.7 g of a homopolymer of acryloyloxyethyltrimethylammonium chloride as a dispersant, 112.3 g of ammonium sulfate, followed by dissolving the contents in 390.6 g of deionized water.

To the solution were added 50.6 g (80% by mole) of acrylamide, 43.8 g (20% by mole) of 90% aqueous solution of acryloyloxyethyldimethylpropylammonium chloride, followed by heating to 50° C. and the air inside was displaced by nitrogen.

To the mixture was further added 1.8 g of 1% aqueous solution of 2,2'-azobis (2-amidinopropane) hydrochloride as an initiator, followed by polymerization with stirring.

As polymerization progressed, the viscosity of the contents increased, resulting in a translucent mass with the passage of 10 hours, without yielding polymer particles dispersed in a salt solution. This result using a monomer (1) where $R_4$ has three carbons should be contracted with the excellent results of Example 1 where $R_4$ has four carbons.

EXAMPLE 4

The effect of the polymer dispersions produced in the Examples according to the present invention are measured when being applied for treatment of waste water comprising aluminum hydroxide drained from a plant manufacturing aluminum sashes.

Method for the floatation test 1. 1000 ml of waste water comprising about 0.5% by weight of a suspended solid was adjusted at pH 7.0 by adding sodium hydroxide.
2. Each polymer solution was added into the waste water and the mixture was stirred so that the suspended solid flocculates.
3. The treated waste water was charged into a pressurized floatation tester, added 500 ml of pressurized air saturated water (4 kg/cm$^2$), and floatation speed of flocks was measured.

The results are shown in the Table 1.

TABLE 1

| Employed dispersion | Added amount of polymer (mg) | Floatation speed (cm/min) |
|---|---|---|
| Example 1 | 10 | 11.4 |
|  | 15 | 20.8 |
| Example 2 | 10 | 14.5 |
|  | 15 | 27.8 |
| Sample 1[1)] | 10 | 8.2 |
|  | 15 | 15.2 |
| Sample 2[2)] | 10 | 5.3 |
|  | 15 | 8.8 |

Note
[1)]Polymer dispersion disclosed in Example 1 of EP-A-0183466 (copolymer of acrylamide and acryloyloxyethyldimethylbenzylammonium chloride (molar ratio 90:10), the viscosity of 0.5% polymer in 1 N NaCl solution is 22.0 cp.)
[2)]Powder type commercial product (copolymer of acrylamide and acryloyloxyethyltrimethylammonium chloride (molar ratio 90:10), the viscosity of 0.5% polymer in 4% NaCl solution is 25 cp.)

As clearly seen from the results in the Table 1, the polymers of the present invention (Examples 1 and 2) give higher floatation speed than the comparative samples (Samples 1 and 2). It is believed that owing to the higher hydrophobic property of longer alkyl chain of the monomer used in the present invention, the bubble holding capacity, thence floatation speed, of the flocks has increased.

EXAMPLE 5

Using the polymer dispersion produced in the Example 3 its performance as the flocculating and dehydrating agents was studied for the sludge of a sewage (night soil) treatment plant was studied.

200 ml of sludge (solid content 1.9%) was put in the 500 ml beaker and aqueous solution (0.2% as polymer) of the polymer dispersion produced in Example 3 was added therein (so that final polymer content to be 1.2% per solid). The liquid was mixed with stirrer with 3 bars (20 mmL, 2 mm dia. for each bar) at 200 rpm for 20 sec. Flocculated sludge was then filtered with 60 mesh nylon filter and after 20 sec. filtration the filtered water amount (Wf ml) was measured.

From the resultant filtered sludge contained water was further squeezed with hydraulic press and the Wd value caluculated by the following equation was determined; Wd=(weight of dehydrated sludge-weight of dry sludge)/ (weight of dry sludge).

Dehydrating condition:
The dehydrated sludge is spread on a sheet of polyester monofilament cloth (30×30 cm$^2$) which is supported with a grooved PVC plate. The sludge is covered with another polyester sheet and another grooved PVC plate at the top. The sludge assembly was placed on the hydraulic press system and pressed under 50 kg/cm² (piston cylinder dia. 20 mm) for 30 sec. The resultant dehydrated sludge was dried at 120 deg. C. for 3 hours and the water content was calculated.

The results are shown in table 2 together with the tests using polymer samples 3 and 4 (see note below). The same polymer content as Example 3 (1.2% polymer/sludge solid) was used.

TABLE 2

| Employed dispersion | Filtered Water Wf (ml) | Dehydrated Sludge Wd (times) |
|---|---|---|
| Example 3 | 98 | 4.41 |
| Example 3[3)] | 103 | 4.81 |
| Sample 4[4)] | 105 | 4.92 |

Note
[3)]Polymer dispersion disclosed in Example 5 of EP-A-0183466 (copolymer of acrylamide and acryloyloxyethyldimethylbenzylammonium chloride (molar ratio 65:35), the viscosity of 0.5% polymer in 1 N sodium sulfate solution is 18 cp.)
[4)]Powder type commercial product (copolymer of acrylamide and acryloyloxyethyltrimethylammonium chloride (molar ratio 65:35), the viscosity of 0.5% polymer in 1 N sodium sulfate solution is 22 cp.)

Comparing with Samples 3 and 4, filtration effect of Example 3, the present invention, is a little inferior to Samples 3 and 4, but the water content of the dehydrated sludge shows clear improvement and it is believed this improvement has come from the hydrophobicity of the polymer of the present invention.

EXAMPLE 6

During paper manufacturing process, a fixing agent for fixing a rosin sizing agent is often employed in order to decrease the added amount of aluminum sulfate. The effect of the polymer dispersions produced in the Examples according to the present invention are measured when being applied as such a fixing agent.

Method for Sizing Test

1. The following agents were added into hardwood bleached kraft pulp in sequential order and the mixture was manufactured into paper by a test sheet machine (basis weight 60 g/m²).

Added Agents

| Rosin sizing agent | 0.5 wt %/pulp |
|---|---|
| Fixing agent | 0.05 wt %/pulp |
| Aluminum sulfate | 0.5, 1, 2 wt %/pulp |

2. Thereafter, the Stöckigt sizing degree of the paper was measured in accordance with JIS P 8122.

The results are shown in the following Table 3.

TABLE 3

| Fixing agent | Sizing Degree (sec.) Added amount of Aluminum Sulfate | | |
|---|---|---|---|
| | 0.5 wt % | 1 wt % | 2 wt % |
| none | 1 | 11 | 32 (for reference) |
| Example 1 | 12 | 29 | — |
| Example 2 | 14 | 34 | — |

TABLE 3-continued

| Fixing agent | Sizing Degree (sec.) Added amount of Aluminum Sulfate | | |
|---|---|---|---|
| | 0.5 wt % | 1 wt % | 2 wt % |
| Sample 1[5)] | 8 | 20 | — |
| Sample 2[6)] | 2 | 8 | — |

Note
[5)]Polymer dispersion disclosed in Example 1 of EP-A-0183466 (copolymer of acrylamide and acryloyloxyethyldimethylbenzylammonium chloride (molar ratio 90:10), the viscosity of 0.5% polymer in 1 N NaCl solution is 22.0 cp.)
[6)]Powder type commercial product (copolymer of acrylamide and acryloyloxyethyltrimethylammonium chloride (molar ratio 90:10), the viscosity of 0.5% polymer in 4% NaCl solution is 25 cp.)

As clearly seen from the results in the Table 2, the polymers of the present invention (Examples 1 and 2) give the paper a higher sizing degree, i.e. water repellent property, than the comparative samples (Samples 1 and 2). It is believed that the higher hydrophobic property of longer alkyl chain of the monomer used in the present invention caused this advantage.

EXAMPLE 7

Using the polymer dispersion produced in the Example 3 its performance as the drainage aid in the paper process was studied.

800 ml of 0.5% pulp suspension (LBKP 100%, CSF 450 ml) was put into a 1000 ml beaker, and Alum (2% per pulp) was added to the suspension while stirring the suspension with Magnetic stirrer. Dispersion polymer samples (0.2% aq. as polymer) was added to the suspension to the concentration of 300 ppm/pulp. The suspension was then fed to Tappi Standard Sheet Machine (screen area 1/50 m²) and sheet was prepared. The both side of the sheet (the basis weight: 200 g/m²) sandwiched between two blankets and water was squeezed while passing through two calendar rollers (clearance 2 mm, pressure 5 kg/cm²). The pressed sheet was dried at 120 deg. C. for 3 hours and water content was calculated. Three polymer samples as in Example 5, i.e. Example 3 of the present invention, and two comparative samples, Samples 3 and 4, were used for the test. The results were shown in the table 4.

TABLE 4

| Employed dispersion | Water Content (%) |
|---|---|
| Example 3 | 55.1 |
| Sample 3 | 55.8 |
| Sample 4 | 56.0 |

The water content using the polymer of the present invention is the lowest, reflecting the hydrophobicity of the monomer.

This invention may be carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A water-soluble cationic polymer or copolymer dispersion prepared by use of a cationic monomer mixture consisting essentially of 5 to 100% by mole of one or more of cationic monomers represented by the following formula (1):

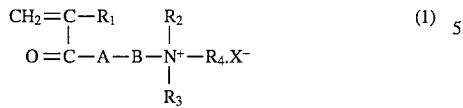

wherein A=O or NH; B=CH$_2$CH$_2$, CH$_2$CH$_2$CH$_2$ or CH$_2$CHOHCH$_2$; R$_1$=H or CH$_3$; R$_2$, R$_3$=CH$_3$ or CH$_2$CH$_3$; R$_4$=(CH$_2$)$_n$CH$_3$ (wherein n=3 to 9); X$^-$=anionic counterion, and 0 to 50% by mole of one or more of cationic monomers represented by the following formula (2):

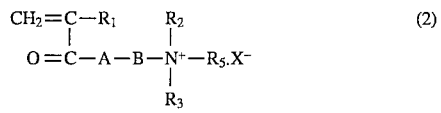

wherein A=O or NH; B=CH$_2$CH$_2$, CH$_2$CH$_2$CH$_2$ or CH$_2$CHOHCH$_2$; R$_1$=H or CH$_3$; R$_2$, R$_3$=CH$_3$ or CH$_2$CH$_3$; R$_5$=H, CH$_3$ or CH$_2$CH$_3$ (wherein the total carbon atoms of R$_2$, R$_3$ and R$_5$, do not exceed 5), X$^-$=anionic counterion, and 0 to 95% by mole of (meth)acrylamide, the dispersion being prepared by a process comprising polymerizing or copolymerizing the cationic monomer mixture with stirring in an aqueous salt solution which does not dissolve the resulting polymer or copolymer and in the presence of a dispersant which is a cationic polymer, soluble in the salt solution, said polymer dispersant comprising at least one monomer represented by formula (2) in an amount of more than 20% by mole.

2. A water-soluble cationic polymer or copolymer dispersion as claimed in claim 1, wherein the molar ratio of the monomer represented by the formula (1) to the monomer represented by the formula (2) is more than 1.

3. A water-soluble cationic polymer or copolymer dispersion as claimed in claim 1, wherein the cationic monomer represented by the formula (1) is a C$_4$~C$_{10}$ alkyl halide quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

4. A water-soluble cationic polymer or copolymer dispersion as claimed in claim 1, wherein the cationic monomer represented by the formula (1) is a butyl halide quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

5. A water-soluble cationic polymer or copolymer dispersion as claimed in claim 1, wherein the cationic monomer represented by the formula (1) is a pentyl halide quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

6. A water-soluble cationic polymer or copolymer dispersion as claimed in claim 1, wherein the cationic monomer represented by the formula (1) is a hexyl halide quaternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

7. A water-soluble cationic polymer or copolymer dispersion as claimed in claim 1, wherein the cationic monomer represented by the formula (1) is a heptyl halide quaternized monomer selected from the group consisting of dimethylaminoethyl (meth)acrylate, dimethylaminohydroxypropyl (meth)acrylate, and dimethylaminopropyl (meth)acrylamide.

8. A water-soluble cationic polymer or copolymer dispersion as claimed in claim 1, wherein the cationic monomer represented by the formula (1) is a octyl halide quaternized monomer selected from the group consisting of dimethylaminoethyl (meth)acrylate, dimethylaminohydroxypropyl (meth)acrylate, and dimethylaminopropyl (meth)acrylamide.

9. A water-soluble cationic polymer or copolymer dispersion as claimed in claim 1, wherein the cationic monomer represented by the formula (1) is a C$_4$~C$_{10}$ alkyl halide quaternized dimethylaminoethyl (meth)acrylate.

10. A water-soluble cationic polymer or copolymer dispersion as claimed in claim 1, wherein the cationic monomer represented by the formula (2) is a hydrochloric acid or sulfuric acid neutralized or methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

11. A water-soluble cationic polymer or copolymer dispersion as claimed in claim 1, wherein the cationic monomer represented by the formula (2) is a methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

12. A water-soluble cationic polymer or copolymer dispersion as claimed in claim 1, wherein the cationic polymer dispersant is the polymerization product of one or more hydrochloric acid or sulfuric acid neutralized or methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

13. A water-soluble cationic polymer or copolymer dispersion as claimed in claim 1, wherein the cationic polymer dispersant is the polymerization product of one or more methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide.

14. A water-soluble cationic polymer or copolymer dispersion as claimed in claim 1, wherein the cationic polymer dispersant is the copolymerization product of acrylamide with one or more hydrochloric acid or sulfuric acid neutralized or methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide, in an amount of more than 20% by mole, the cationic polymer dispersant being soluble in the salt solution as a polymerization medium.

15. A water-soluble cationic polymer or copolymer dispersion as claimed in claim 1, wherein the cationic polymer dispersant is the copolymerization product of acrylamide with one or more methyl chloride or dimethyl sulfate quarternized monomer selected from the group consisting of dimethylaminoethyl (meth)acrylate, diethylaminoethyl (meth)acrylate, dimethylaminohydroxypropyl (meth)acrylate, and dimethylaminopropyl (meth)acrylamide, in an amount of more than 20% by mole, the cationic polymer dispersant being soluble in the salt solution as a polymerization medium.

16. A water-soluble cationic polymer or copolymer dispersion as claimed in claim 1, wherein the amount of cationic polymer dispersant is 1 to 10% by weight, based on the total weight of monomers.

17. A water-soluble cationic polymer or copolymer dispersion as claimed in claim 1, wherein the salt contained in the salt solution as a polymerization medium is a polyvalent anion salt.

18. A water-soluble cationic polymer or copolymer dispersion as claimed in claim 1, wherein the salt contained in the salt solution as a polymerization medium is a polyvalent anion salt selected from the group consisting of sodium sulfate, ammonium sulfate, magnesium sulfate, aluminum sulfate, sodium dihydrogenphosphate, and mixtures thereof.

19. A water-soluble cationic polymer or copolymer dispersion as claimed in claim 1, wherein the amount of salt contained in the salt solution as a polymerization medium is more than 15% by weight.

20. A method for treating waste water with a flocculant, comprising the steps of adding an effective amount of the polymer dispersion according to claim 1 as a flocculant into waste water.

21. A method for treating waste water with a flocculant according to claim 20, wherein the flocculant is used as a dehydrating agent or a floating agent.

22. A method for treating waste water with a flocculant, comprising the steps of adding an effective amount of the polymer dispersion according to claim 1 as a flocculant into waste water comprising sludge so as to flocculate the sludge, and removing the flocculated sludge from water.

23. In the method of incorporating a paper chemical in the manufacture of paper, utilizing the polymer dispersion according to claim 1.

24. In the method of incorporating a paper chemical in the manufacture of paper according to claim 23, wherein the utilized polymer dispersion functions as the retention aid for paper chemicals or as the drainage aid for water.

25. A method for manufacturing paper with a paper chemical, comprising the steps of adding a sizing agent, an effective amount of the polymer dispersion according to claim 1 as a paper chemical into pulp, and manufacturing paper so as to retain the sizing agent by the polymer.

26. A method for manufacturing paper with a paper chemical, comprising the steps of adding an effective amount of the polymer dispersion according to claim 1 as a paper chemical into pulp, and manufacturing paper so as to speedy drain water contained therein.

* * * * *